United States Patent [19]

Caviar

[11] Patent Number: 4,491,686

[45] Date of Patent: Jan. 1, 1985

[54] ELECTRICAL CONNECTOR

[75] Inventor: Lee Caviar, Lenexa, Kans.

[73] Assignee: Imperial Underground Sprinkler Co., Lenexa, Kans.

[21] Appl. No.: 451,924

[22] Filed: Dec. 21, 1982

[51] Int. Cl.³ ........................................ H02G 15/08

[52] U.S. Cl. ........................................ 174/87; 174/76; 174/82; 174/88 S

[58] Field of Search .................... 174/76, 82, 88 S, 91, 174/93, 87

[56] References Cited

U.S. PATENT DOCUMENTS

| | | | |
|---|---|---|---|
| 997,066 | 7/1911 | Krannichfeldt . | |
| 1,297,614 | 3/1919 | Van Viersen . | |
| 3,254,153 | 5/1966 | Kohler | 174/91 |
| 3,504,099 | 3/1970 | Beinhaur | 174/72 |
| 3,597,528 | 8/1971 | Penfield et al. | 174/87 |
| 3,614,295 | 10/1971 | Gillemot et al. | 174/76 |
| 3,730,970 | 5/1973 | Johnson | 174/73 R |
| 3,874,760 | 4/1975 | Guthmiller et al. | 174/91 X |
| 3,937,870 | 2/1976 | Bumpstead et al. | 174/87 |

*Primary Examiner*—A. T. Grimley
*Assistant Examiner*—Morris H. Nimmo
*Attorney, Agent, or Firm*—Litman, Day & McMahon

[57] ABSTRACT

An electrical connector for insulating a connection between at least two wires. The connector includes a cup shaped casing and an inner core, each having a closed end and an open end. The inner core is received within the casing defining a fully enclosed sealed cavity therein in which an insulating compound is received. The casing includes an end wall which has a plurality of recesses extending inwardly of a surface thereof terminating in thin covering membrane. A piercing member is provided for forming apertures in each of the membranes for receipt of a wire therethrough, said apertures each having a diameter slightly less than an associated wire extending therethrough providing a snug fit therearound, thereby sealing the connector cavity.

12 Claims, 9 Drawing Figures

ELECTRICAL CONNECTOR

BACKGROUND OF THE INVENTION

This invention relates to electrical connectors and in particular, to such a connector which is insulated and has an enclosed cavity wherein the connected wires are received.

It is necessary in many instances to provide a totally insulated connection or splice between two electrical wires such as in underground electrical connections. Typically, insulated connectors for such use include a generally tubular casing having an open end and a closed end. A plug is received within a casing open end defining a totally enclosed cavity therein. Apertures are provided in either the casing end or the plug through which the wires to be connected are received and thereafter connected by suitable means. An insulating potting compound is poured into the casing after which the plug is operably received within the casing open end.

Drawbacks of such prior connectors have included the fact that the apertures through which the wires are received have not provided a seal around the wires to insulate the interior of the connector from the elements and to prevent the potting compound from exiting the connectors.

SUMMARY OF THE INVENTION

Therefore, an electrical connector is provided for insulating the connection between two or more electrical wires. The connector comprises a cup-shaped casing and an inner core. The casing includes a generally cylindrical side wall having an open end and a closed end defined by an end wall. The inner core has a surrounding wall generally concentric with the casing side wall with the surrounding wall also having an open end and a closed end defined by an end wall. The inner core is snugly received within the casing with the inner core open end adjacent the casing end wall, thus forming a fully enclosed cavity which is sealed when a potting compound is received therein.

One of the end walls includes a plurality of recesses therein terminating in a thin membrane which overlies the recess. A piercing member is provided which allows a user to pierce a membrane for each wire which is to be connected and insulated within the connector, consequently providing an aperture in the membrane through which the wire is passed. Preferably, the piercing member can form apertures of various sizes within the membranes, which allows the use of wires of various gauges therewith. Also, the pierced apertures are preferably slightly smaller in diameter than the wires forming a snug seal with the wires when placed therethrough. The piercer is integrally formed with either the casing or inner core, whichever does not have the recesses therein.

After the wires are inserted through the pierced apertures and connected, a potting compound is poured into the inner core and the inner core and casing are joined together, thereby forming a fully insulated electrical connector.

OBJECTS OF THE INVENTION

Therefore, the objects of the present invention are: to provide an electrical connector which provides an insulated, sealed electrical connection; to provide such a connector which has an enclosed cavity in which potting compound is received to insulate the connection; to provide such a connector which prohibits the leaking of potting compound therefrom; to provide such a connector which includes a casing having an inner core received therein with a plurality of recesses being formed in an end wall of the casing or inner core, the recesses being covered by a thin, pierceable membrane; to provide such a connector which includes an integral piercing member for forming apertures in the membranes to accommodate the electrical wires sealed therewithin; to further provide such a piercing member which includes a plurality of steps corresponding to a diameter of wires of different gauges, to further provide such a piercing member which is enclosed within said connector when fully assembled, and to provide such a connector which is easy to manufacture, capable of providing a fully sealed insulated connection, is durable in use and particularly well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
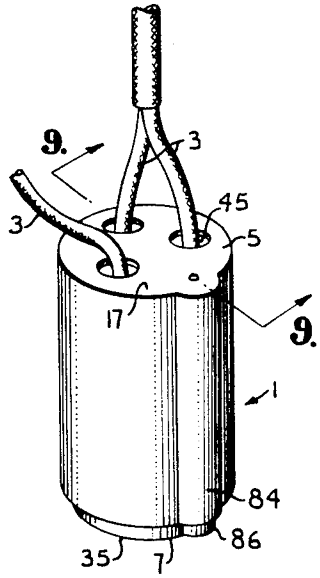
FIG. 1 is a perspective view of an insulated electrical connector according to the present invention shown in an assembled, operable state.
Figure 9:
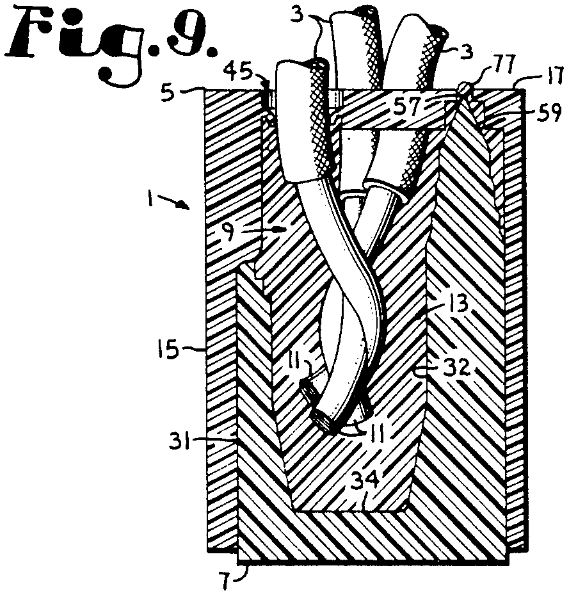
FIG. 9 is a cross-sectional view of a fully assembled connector taken along line 9—9 in FIG. 1.

The reference numeral 1 generally designates an electrical connector according to the present invention, see FIGS. 1 and 9. The connector 1 is used to provide a fully insulated connection between at least two electrical wires 3. Such a connector 1 is typically used when the connection between wires must be made in a moist environment, such as underground, where a possibility exists of corrosion of the connection resulting in a breaking of a circuit formed by the wires. A particular example of the use of the connector 1 is in the making of electrical connections for underground water sprinkling systems; however, it is understood that the connector 1 can be used with other devices according to the present invention.

Figure 4:
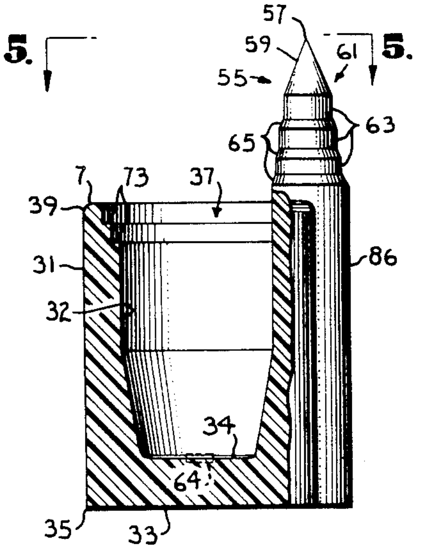
FIG. 4 is a longitudinal cross-sectional view of an inner core of the electrical connector.
Figure 5:
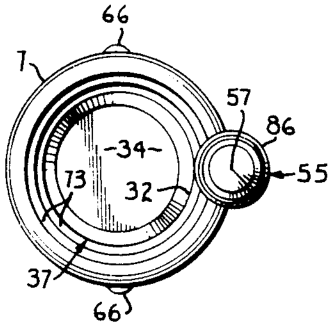
FIG. 5 is a top plan view of the inner core taken along line 5—5 in FIG. 4.

In more particularly describing the invention, the connector 1 generally comprises a casing 5 (see FIG. 2) and an inner core 7 (see FIG. 4). The inner core 7 is received within the casing 5 forming a totally sealed inner cavity 9. End portions 11 of wires 3 are received in the cavity 9 as is an amount of insulating, potting compound 13 in which the wire ends 11 reside, thus forming an insulated connection between the wires 3.

The casing 5 comprises a cup-shaped member having a continuous surrounding wall 15 and an end wall 17 covering a first end 18 of the casing 5. The casing 5 includes an opening 21 thereinto at a second end 23 opposed to first end 18.

Figure 8:
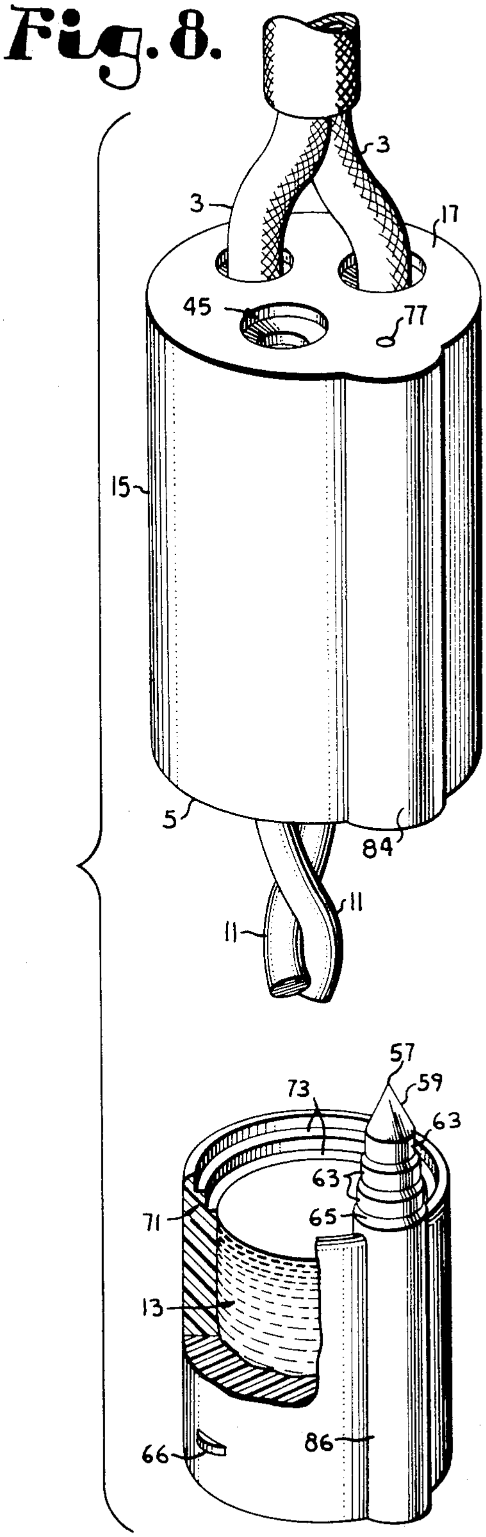
FIG. 8 is an exploded perspective view of the connector showing the casing and inner core in a position prior to assembly.

The inner core 7 is adapted to be snugly received within the casing 5 through opening 21 and comprises a surrounding side wall 31 having an inner surface 32 and an end wall 33 having an inner surface 34 and covering a first end 35 of the side wall 31 (FIG. 8 shows casing 5 and core 7 apart and FIG. 9 shows them together). An opening 37 is provided at a second end 39 of the side wall 31 and is opposed to the inner core first end 35. The inner core side wall 31 is generally concentric with the casing surrounding wall 15 and has outer dimensions slightly smaller than inner dimensions of the casing surrounding wall 15, allowing the inner core 7 to be snugly and slidably received within the casing 5. The inner cavity 9, see FIG. 9, is provided for receipt of the wire ends 11 when the core 7 is received with the casing 5.

Preferably, the casing 5 and inner core 7 are generally tubular in shape with cylindrical walls. However, it is understood that the connector 1 can comprise other geometric configurations according to the present invention.

In order for the wires to be inserted into the cavity 9, ingress means 45 are provided in either the casing end wall 17 or the inner core end wall 33. As shown herein in FIGS. 2, 8 and 9, the ingress means 45 are associated with the casing end wall 17, but they can be associated with the inner core end wall 33, still according to the present invention. Preferably, there are two or more ingress means 45 provided. Also, it is preferred that the ingress means 45 each comprise a substantially sealed element whether or not a wire 3 has been inserted therethrough. For example, if three ingress means are provided and only two such wires are connected within the connector, it is desirable that all three, including the third, be substantially sealed upon full assembly of the connector.

Figure 6:
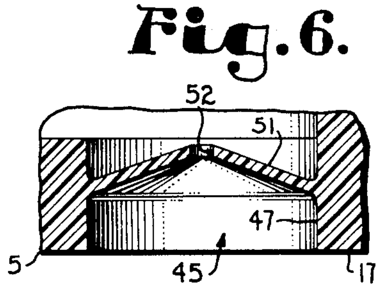
FIG. 6 is an enlarged cross-sectional view of a portion of the casing showing a membrane thereof.

As shown herein in FIG. 6 prior to piercing, each ingress means includes a passageway 47 being occluded by a thin membrane 51 which covers and substantially seals the passageways 47. The membranes 51 include a small centered orifice 52 as will be explained later. As shown herein, the membrane 51 has an inward concavity, however the membranes 51 can be planar or of other shapes still according to the present invention.

Figure 7:
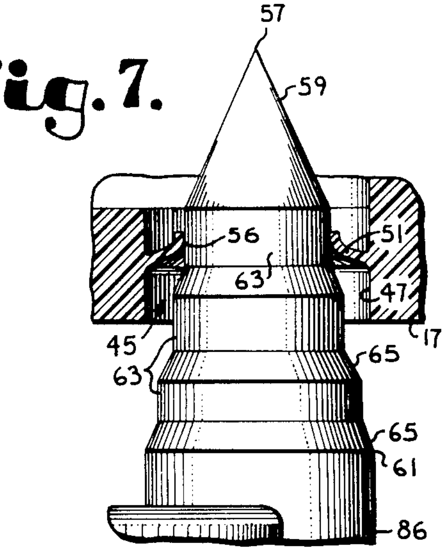
FIG. 7 is an enlarged cross-sectional view of the casing showing a piercing member in position forming an aperture in a membrane.

In order to facilitate the insertion of the wires 3 through membranes 51 a piercing member 55 (FIGS. 4, 7 and 8) is provided which punctures the membranes 51 forming larger apertures 56 therethrough for receipt of the wires 3, see FIG. 7. As shown herein, the piercing member 55 extends from the inner core second end 39, thus allowing the piercing member 55 to be enclosed within the cavity 9 when the connector is assembled; however, it is understood that the piercing member 55 can be integral with the connector in other manners according to the present invention.

The piercing member 55 comprises a point 57, a beveled head 59 and a shank portion 61. Preferably, the piercing member 55 can be used to puncture apertures 56 of various sizes commensurate with wires 3 of varying gauge having varying outer diameters. As such, the shank 61 is provided with a plurality of substantially cylindrical concentric steps 63 spaced apart by beveled transition portions 65. Preferably, diameter dimensions of each of the steps 63 are substantially equivalent to a diameter of a different gauge of wire. The transition portions 65 act as a continuation of the beveled head 59 allowing formation of apertures 56 of a continuous range of sizes. The steps 63 allow a user of the connector 1 to quickly form apertures 56 of the sizes most commonly used. It is envisioned that the piercing member could be fabricated without the steps 63.

Included in an inner surface 62 of the casing side wall 15 are recesses 64 which operably receive tabs 66 extending outwardly from the inner core 7.

As shown herein, the inner core 7 is slidably received within the casing 5 with the inner cavity 9 being bounded by the casing end wall 17, a portion of the casing surrounding wall 15, the inner core side wall inner surface 32 and the inner core end wall inner surface 34. The potting compound preferably fills the cavity 9 when the casing 5 and inner core 7 are slid together to form a fully insulated inner cavity.

In order to assure that the amount of potting compound 13 is the right amount to completely fill the cavity 9, measuring means 71 are provided with the inner core 7. The measuring means 71 comprise a series of steps 73 formed in the inner core side wall inner surface 32. The steps are related to the size or gauge of wire along with the number of wires which are to be received within cavity 9. The steps indicate how much potting compound 13 should be placed within the inner core 7 prior to mating the casing 5 with inner core 7 to completely fill the cavity 9 when fully assembled.

Figure 2:
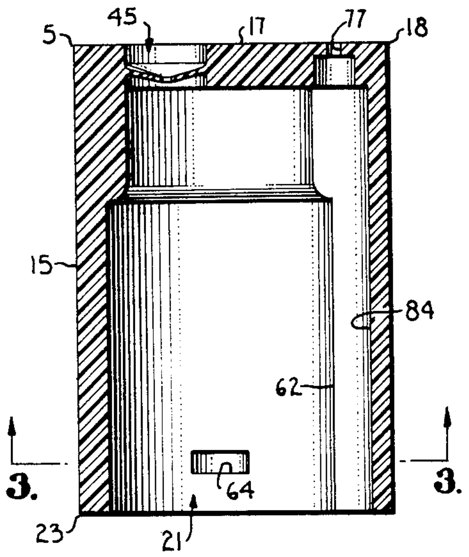
FIG. 2 is a longitudinal cross-sectional view of a casing of the electrical connector.
Figure 3:
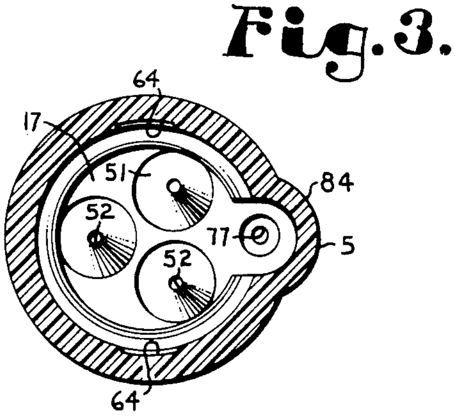
FIG. 3 is a transverse cross-sectional view of the casing taken along line 3—3 in FIG. 2.

A relief hole 77, as seen in FIG. 2, is provided in the casing end wall which allows air and any excess compound to be evacuated from the inner cavity 9 when the casing 5 and inner core 7 are mated. As shown herein, the position of the relief hole 77 is aligned with the piercing member tip 57 so that the tip extends into and occludes the relief hole 77 upon total insertion of the inner core 7 into the casing 5 further assuring a fully enclosed inner cavity 9.

An alignment means is provided to properly align the inner core 7 with the casing 5 when assembling the connector to assure that piercing member point 57 is aligned with casing relief hole 77. As shown herein the alignment means comprises a groove 84, see FIGS. 2 and 8, extending radially outwardly from the casing surrounding wall 15 and a rib 86, see FIG. 8, extending outwardly from the core side wall 31. The rib 86 mates with the groove 84 when sliding the inner core 7 into the casing 5. As shown herein, the rib 86 is aligned with the piercing member 55. However, it is understood that the rib can be positioned circumferentially spaced from the piercing member.

In using the connector 1, apertures 56 are formed in a suitable number of membranes 51 corresponding to the number of wires to be connected therewithin. The small membrane orifices 52 centrally align the piercing member point 57 with the membrane 51 assuring a centered aperture 56. Further, the apertures 56 have a diameter commensurate with the outer diameter of the wires 3.

Since the connector is made of a suitable resilient plastic material such as acrylonitrile-butadiene-styrene (ABS), when forming the apertures 56, the material comprising the membranes is stretched without any ripping or tearing of the membrane see FIG. 7. Further, after the piercing member is retracted from the aperture formed thereby, the material adjacent the newly formed aperture contracts a small amount because of a buildup of inner tension within the membrane as a result of the stretching of the membrane when forming the apertures.

After the apertures 56 are formed, the wires 3 are inserted therethrough see FIG. 9, and their free ends are secured together by either twisting the wires together or clamping the wires together by a suitable clamp (not shown). Since the apertures 56 have decreased in size slightly, owing to the contracting of the material therearound, the wires 3 are securely held stationary relative to the casing 5 allowing easy manipulation of the wires 3 while connecting them. Once the wires are connected, all excess wire is drawn back through the apertures 56 leaving only the connected ends within the casing. At this time a sufficient amount of potting compound is poured into the inner core using an appropriate step 73 for a reference. After the inner core 7 has been filled with a suitable amount of compound 13, the two pieces, the casing 5 and inner core 7 are slid together until the inner core tabs 66 are received within the casing recesses 64. As the connector is joined, the wires 3 are urged into the potting compound 13 displacing portions of the compound 13 from within the inner core 7 and filling the cavity 9. Any excess compound will be urged past relief hole 77 prior to the occluding of the relief hole 77 by the piercing member tip 57. The small membrane apertures 52 are preferably too small to allow any significant amount of the viscuous potting compound to pass through prior to setting of the compound.

It is to be understood that while certain forms of the present invention have been illustrated and described herein, it is not to be limited to the specific forms or arrangement of parts described and shown.

What is claimed and desired to be secured by Letters Patent is as follows:

1. An electrical connector in combination with at least two wires and potting compound for insulating a connection between the wires, each wire having an outer diameter associated therewith, said connector comprising:

(a) a cup-shaped casing having a continuous surrounding wall and a covering end wall closing a first end thereof, said casing including an opening thereinto at an end of said surrounding wall opposed to said covering end wall;

(b) an inner core snugly receivable within said casing and having a continuous side wall generally concentric with said casing wall, said side wall having first and second ends and said inner core having an end wall at said first end of said side wall and an opening thereinto at said second end of said side wall, said core receivable within said casing with said core opening oriented toward said casing end wall and with said core end wall adjacent said casing opening, thereby defining a fully enclosed inner cavity when said core is received within said casing;

(c) a plurality of recesses extending into said casing end wall, each of said recesses defining a passageway between said inner cavity and an exterior portion of said connector; each of said passageways being initially substantially occluded by a thin, pierceable covering membrane; each of said membranes being formed of a stretchable material such that, when pierced, said membrane remains connected to said passageway and snugly engages what has pierced therethrough;

(d) piercing means having a pointed tip thereof engageable with each of said membranes for forming an aperture therethrough of a diameter commensurate with a diameter of one of said wires to be connected such that each of said membranes receives a respective one of said wires therethrough and substantially snugly surrounds the respective wire substantially sealing each of said passageways about respective wires, thereby providing a fully enclosed sealed connector; and wherein; said potting compound is deposited in said enclosed sealed connector and generally maintained therein by said membranes from leakage around said wires at said respective membranes.

2. The connector as set forth in claim 1 wherein:

(a) said piercing means includes a plurality of concentric step portions each having a successively greater diameter equal to a diameter of different wires whereby a user of said connector can form apertures in said membranes equal in size to a desired size of wire.

3. The connector as set forth in claim 1 wherein:

(a) said piercing means has a beveled head portion and a shank portion.

4. The connector as set forth in claim 3 wherein:

(a) said shank portion includes a plurality of concentric cylindrical steps joined by a beveled transitional portion, a diameter of each of said steps is generally equal to a diameter of a wire of a different selected gauge, and said beveled transitional portions are adapted to accommodate wires of a different selected gauge.

5. The connector as set forth in claim 1 including:

(a) a measuring means indicating a volume of potting compound to be placed within said connector inner cavity to allow the inner cavity to be completely filled by said potting compound when said connector is assembled.

6. The connector as set forth in claim 5 wherein:

(a) said measuring means includes a plurality of means each indicating a different volume of potting compound to be placed within said cavity to completely fill the cavity when using wires having varying diameters.

7. In combination two electrical wires, potting compound and an insulating electrical connector adapted to provide a sealed and insulated connection between the two electrical wires, the connector including mating portions forming an enclosed cavity therein, said cavity receiving the potting compound and ends of the wires to be connected therein, an associated one of the connector mating portions including ingress means through which the wires extend, the improvement wherein:

(a) said ingress means includes for each of the wires respectively:

(1) a passageway through the associated connector mating portion joining said cavity with an exterior portion of said connector; and (2) a thin, stretchable and pierceable membrane substantially sealing said passageway prior to use of said connector, said membrane adapted to be pierced by a piercing member so as to define an aperture therethrough approximating a cross section associated with the respective wire and said membrane remaining substantially connected to said passageway after piercing; said membrane stretching about said respective wire after said respective wire is received therein such that said passageway is substantially sealed about said respective wire, such that said membrane snugly contracts about and substantially surrounds said respective wire so as to generally prevent the leakage of potting compound about said respective wire but to allow gases to relieve during wire connection.

8. The improved electrical connector as set forth in claim 7 wherein:

(a) each of said membranes includes a small centered orifice adapted to align the piercing member so that the apertures are centrally aligned within the passageway.

9. An electrical connector for insulating a connection between at least two wires, each exhibiting an outer diameter, said connector comprising:

(a) a cup-shaped casing having a continuous surrounding wall and a covering end wall closing a first end thereof, said casing including an opening thereinto at an end of said surrounding wall opposed to said covering end wall;

(b) an inner core snugly receivable within said casing and having a continuous side wall generally concentric with said casing wall, said core side wall having first and second ends and said inner core having an end wall at said first end of said side wall and an opening thereinto at said second end of said side wall, said core receivable within said casing with said core opening oriented toward said casing end wall and with said core end wall adjacent said casing inner opening, thereby defining a fully enclosed inner cavity when said core is received within said casing;

(c) said inner core end wall includes an edge spaced from said casing covering wall a first distance when operably positioned therein;

(d) a plurality of recesses extending into said casing end wall, each of said recesses terminating in a thin, pierceable covering membrane; and (e) a piercing member having a pointed tip thereof and being attached to and integral with said inner core; said pointed tip being engageable with each of said membranes for forming an aperture therethrough with a diameter commensurate with a diameter of a wire to be connected so as to provide for snug receipt of the wire therethrough; and said piercing member extending from said second end of said core side wall a second distance not greater than said first distance whereby, when said inner core is positioned within said casing, said piercing member tip does not engage said covering wall.

10. An electrical connector for insulating a connection between at least two wires, each exhibiting an outer diameter, said connector comprising:

(a) a cup-shaped casing having a continuous surrounding wall and a covering end wall closing a first end thereof, said casing including an opening thereinto at an end of said surrounding wall opposed to said covering end wall;

(b) an inner core snugly receivable in said casing and having a continuous side wall generally concentric with said casing wall, said side wall having first and second ends and said inner core having an end wall at said first end of said side wall and an opening thereinto at said second end of said side wall, said core receivable within said casing with said core oreiented toward said casing end wall and with said core end wall adjacent said casing opening, thereby defining a fully enclosed inner cavity when said core is received within said covering;

(c) a plurality of recesses extending into said casing end wall, each of said recesses terminating in a thin, pierceable covering membrane;

(d) a piercing member attached to and integral with said inner core and extending from said second end of said core side wall; said piercing member having a pointed tip thereof selectively engageable with said membranes for forming an aperture therethrough of a diameter commensurate with a diameter of a wire to be connected so as to provide for snug receipt of the wire therethrough;

(e) said casing end wall having a relief hole therethrough spaced from said recesses, said relief hole positioned opposite said piercing member tip and in operative alignment with said piercing member tip when said core is operably received within said casing; and (f) said piercing member tip being received in and occluding said relief hole when said core is fully positioned within said casing, thereby providing a fully enclosed sealed connector.

11. The connector as set forth in claim 10 wherein:

(a) said connector includes alignment means for aligning said piercing member tip opposite said relief hole when said inner core is operably received in said casing.

12. The connector as set forth in claim 11 wherein:

(a) said alignment means comprises:

(1) a groove extending radially outwardly in said casing surrounding wall; and (2) a rib extending radially outwardly from said inner core side wall and mateable with said casing groove.

* * * * *